United States Patent [19]

Andrews et al.

[11] Patent Number: 4,722,809

[45] Date of Patent: Feb. 2, 1988

[54] FLAME RETARDED POLYAMIDE COMPOSITIONS

[75] Inventors: Philip S. Andrews; Karl W. Rausch, Jr., both of Hamden; Kemal Onder, North Haven, all of Conn.

[73] Assignee: The Dow Chemical Company, Midland, Mich.

[21] Appl. No.: 909,806

[22] Filed: Sep. 22, 1986

[51] Int. Cl.$^4$ ............... C09K 21/00; B32B 27/36; B27N 9/00; C08K 5/02

[52] U.S. Cl. .................... 252/609; 106/18.24; 252/601; 260/DIG. 24; 524/126; 524/469; 524/470; 524/471; 521/907; 428/412; 428/920; 428/921

[58] Field of Search .................. 428/920-921, 428/412, 913; 252/609, 601; 524/409, 467, 469, 471, 470, 464, 126; 260/DIG. 24; 106/18.11, 18.24, 18.25; 525/389; 521/907; 528/332

[56] References Cited

U.S. PATENT DOCUMENTS

| | | | |
|---|---|---|---|
| 3,418,267 | 12/1968 | Busse | 260/33.8 |
| 3,836,501 | 9/1974 | Tacke et al. | 260/37 N |
| 3,981,843 | 9/1976 | Yoshizaki et al. | 524/409 |
| 3,989,531 | 11/1976 | Orlando et al. | 524/409 |
| 4,062,828 | 12/1977 | Herwig et al. | 260/45.7 P |
| 4,065,441 | 12/1977 | Andrews et al. | 260/78 R |
| 4,072,665 | 2/1978 | Onder | 260/78 R |
| 4,078,016 | 3/1978 | Kramer | 524/603 |
| 4,087,481 | 5/1978 | Onder | 260/857 TW |
| 4,151,322 | 4/1979 | Rosenthal et al. | 428/253 |
| 4,156,065 | 5/1979 | Onder et al. | 528/51 |
| 4,544,583 | 10/1985 | Claussen et al. | 428/412 |

FOREIGN PATENT DOCUMENTS 129825  1/1985  European Pat. Off. .

OTHER PUBLICATIONS

Encyclopedia of Polymer Science and Technology, vol. 10, 1969, pp. 710 et seq., Interscience Publishers, New York, N.Y. (particularly pp. 728, 730, 742, 744, and 747).

Primary Examiner—Stephen J. Lechert, Jr.
Assistant Examiner—Howard J. Locker
Attorney, Agent, or Firm—J. S. Rose

[57] ABSTRACT

Flame-retardant blends are provided comprising a particular type of aromatic-aliphatic copolyamide and a flame-retardant amount of an oligomeric or polymeric halogenated aromatic polycarbonate.

The blends are characterized by being transparent and meeting the V-O rating when tested in accordance with the Underwriters Laboratories UL-94 vertical burn test.

11 Claims, No Drawings

FLAME RETARDED POLYAMIDE COMPOSITIONS

FIELD OF THE INVENTION

This invention relates to blends containing polyamides and is more particularly directed to blends of certain aromatic-aliphatic copolyamides with fire retardant modifiers.

DESCRIPTION OF THE PRIOR ART

A series of copolyamides has recently been introduced to the commercial marketplace in which the acid moiety of the polyamide is derived from a mixture of aliphatic dicarboxylic acids or mixtures of an aliphatic and an aromatic dicarboxylic acid while the amine or amide forming moiety is derived from a diamine or diisocyanate which is aromatic in nature. Such copolyamides are described in detail in U.S. Pat. Nos. 4,065,441; 4,072,665; 4,087,481; and 4,156,065.

These copolyamides are characterized by ease of melt processing, excellent physical properties and, in certain cases, by ease of conversion to the crystalline state. However, when exposed to burn tests these copolyamides are not self-extinguishing when the flame source is removed, and tend to suffer from flaming drip. This lack of self-extinguishing properties precludes the use of these otherwise valuable copolyamides in numerous applications which call for specific fire retardancy.

The prior art has disclosed numerous and sundry additive ingredients for the flameproofing of polyamides of many diverse types. For example, one of the many references disclosing triaryl phosphates is French patent No. 2504715 which discloses fire retardant polyhexamethylene sebacamides containing 10 to 30 weight percent of phosphate flameproofing agents, particularly tricresyl phosphate. However, the presence of such large concentrations of triaryl phosphates which themselves act as plasticizers can have detrimental effects on the properties of the base polyamides. U.S. Pat. No. 3,418,267 solved this problem through the use of a combination of an organic halide (such as polychlorinated biphenyls) with a metal oxide (such as antimony oxide).

U.S. Pat. No. 3,836,501 discloses self-extinguishing polyamide molding compositions based generally on aliphatic polyamides wherein the flame retardant additives called for comprise a broad class of oligomeric or polymeric halogen containing compounds in combination with metal oxides. In spite of the presence of metal oxides, the blends so produced fail to provide the highest level of fire retardancy desired. Additionally, the presence of the metal oxides causes the resultant polymer blends, if they were originally transparent, to be quite opaque.

European Patent No. 129,825 discloses fire retardant blends of (a) polyamides particularly the aliphatic nylons with (b) polyphenylene ether resins. The reference blends contain organic phosphates to allow the mixtures to be homogeneously prepared without the need for melt blending. The presence of the compatibilizing phosphates imparts fire retardancy to the blends which property can be enhanced by the presence of brominated compounds, particularly oligomeric tetrabromobisphenol A polycarbonates.

Predominantly, the prior art has been concerned simply with providing flame retardant polyamides, particularly the aliphatic nylon types. The question of transparency of the resultant blends has neither been addressed nor fully recognized. U.S. Pat. No. 4,062,828 does disclose fire retardant polyamides, again of the aliphatic type, wherein both fire retardancy and transparency are achieved through the use of certain phosphinylphosphinic acids.

We have now discovered that the aromatic-aliphatic copolyamides referred to above can be easily rendered flame retardant to the highest rating of V-O when tested in accordance with the Underwriters Laboratory UL-94 vertical burn test (defined hereinbelow) by blending with particular halogenated compounds described below. Surprisingly, the high level of flame retardancy is reached at low levels of additive while at the same time the copolyamide blends maintain their original transparency when molded. In a further advantage to flow from the present blends, molded parts of very thin section, e.g. 1/16", can be obtained with a V-O rating. Heretofore, this has been difficult to achieve.

Optionally, synergistic quantities of triaryl phosphates may be added to the blends so that the same levels of fire retardancy can be achieved at even lower levels of the halogenated compounds.

SUMMARY OF THE INVENTION

This invention comprises transparent flame-retardant polymer blends which comprise (1) a copolyamide characterized by a recurring unit of the formula

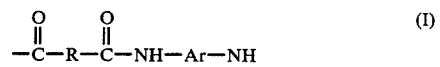

wherein Ar represents arylene and, in about 30 to about 85 percent of the recurring units, R represents alkylene from 6 to 12 carbon atoms, inclusive, in 0 to about 70 percent of the recurring units R represents m-phenylene, and in 0 to about 50 percent of said recurring units R represents tetramethylene; and (2) a flame-retardant amount of an oligomeric or polymeric halogenated aromatic polycarbonate.

The term "arylene" means a divalent arylene containing radical derived from an aromatic hydrocarbon having from 6 to 18 carbon atoms, inclusive, such as phenylene, tolylene, xylylene, naphthylene, diphenylylene, and radicals having the formula

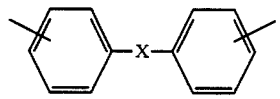

wherein X is selected from the group consisting of —SO$_2$—, —CO—, —O—, and lower alkylene from C$_1$ to C$_4$, such as 4,4'-oxydiphenylene, 4,4'-sulfonyldiphenylene, 4,4'-carbonyldiphenylene, 4,4'-isopropylidenediphenylene, 4,4'-methylenediphenylene, 2,4'-methylenediphenylene, 3,3'-dimethyl-4,4'-methylenediphenylene, and the like, and mixtures thereof.

The term "alkylene from 6 to 12 carbon atoms, inclusive," means straight or branched chain alkylene having the stated total number of carbon atoms. Illustrative of alkylene are hexylene, heptylene, octylene, nonylene, decylene, undecylene, dodecylene and isomeric forms thereof.

The term "flame-retardant amount" as used herein means an amount which is sufficient to result in the copolyamide (I) receiving a V-O rating when tested in accordance with the Underwriters Laboratories UL-94 vertical burn test defined in detail hereinbelow.

DETAILED DESCRIPTION OF THE INVENTION

The novelty, and, the critical feature of the present invention, resides in the combination of the particular copolyamides (I) defined above and halogenated aromatic polycarbonates to result in polymer blends characterized by flame retardancy rated as 94 V-O (defined below) and being clear transparent materials when molded and shaped. The use of other halogenated polymers such as brominated styrenes and epoxides in place of the halogenated polycarbonates will result in 94 V-O ratings but will not provide clear transparent moldings.

The polymer blends of the invention are prepared readily by direct admixture of the individual components in any convenient manner. Illustratively, the components are admixed in comminuted form such as powder or in the form of chips, pellets and the like, using manual or mechanical mixing in the appropriate mixing apparatus. For example, the components can be brought together in solid or solid/liquid form and blended using conventional means such as a barrel mixer, a tumble mixer, and the like. Preferably, the components are melt-blended either directly or after having been premixed as described above. Conveniently, the melt-blending may be carried out by extrusion of the mixture using standard extruding equipment. The product in strand, sheet, rope or like form is then chopped or pelletized to whatever shape is desired for ultimate use.

The proportions in which the oligomeric or polymeric-polycarbonate can be employed will vary, inter alia, according to the copolyamide itself, the polycarbonate employed along with its halogen content, and whatever economic or physical property considerations which might place an upper limit on its concentration. The important consideration is that it be employed in sufficient amount that the blend receives a V-O rating. Generally speaking, the advantageous amount which will bring about the V-O rating is from about 2 to about 8 percent by weight based on the combined weight of copolyamide and halogenated polycarbonate. Preferably, the halogenated polycarbonate is employed within the range of from about 3 to about 7 percent by weight.

The halogenated polycarbonates as defined above can be any of the known oligomeric or polymeric aromatic polycarbonates wherein the aromatic nuclei are substituted with halogen groups at least to the extent that the halogen content of the polycarbonate falls within the range of about 10 to about 80 percent by weight and preferably from about 30 to about 70 percent by weight of the polymer. The term "halogen" includes fluorine, chlorine, bromine, and iodine.

The halogenated polycarbonate materials are well known and commercially available. They are typically disclosed, for example, in the "Encyclopedia of Polymer Science and Technology", Vol. 10, 1969, pp. 710 et seq., Interscience Publishers, New York, N.Y. The oligomeric and polymeric materials can be readily obtained by halogenating the oligomeric or polymeric polycarbonate precursor using known halogenation methods. Typical of the commercially available materials are the brominated oligomeric aromatic polycarbonates identified as Great Lakes BC-52 and BC-58 supplied by Great Lakes Chemical Corp., West Lafayette, Ind. The preferred halogen substitution is chlorine or bromine with the latter most preferred. Preferred as a class are the oligomeric halogenated polycarbonates with the oligomeric bisphenol A polycarbonates being most preferred within this class.

Illustrative of the oligomeric or polymeric halogenated polycarbonates are those prepared from a derivative of carbonic acid, such as carbonic acid diester, e.g. diethyl(carbonate) or dihalogenide(phosgene) and 4,4'-di-hydroxy-3,3'-dichlorodiphenyl-2,2-propane, 4,4'-dihydroxy-3,3',5,5'-tetrachlorodiphenyl-2,2-propane, 4,4'-dihydroxy-3,3',5,5'-tetrabromodiphenyl-2,2-propane, 4,4'-dihydroxy-3,3',5,5'-tetrachlorodiphenyl-1,1-cyclohexane, 4,4'-dihydroxy-3,3',5,5'-tetrachlorodiphenyl-sulfone, 4,4'-dihydroxy-3,3',5,5'-tetrabromodiphenylsulfone, and the like. Preferred species are the brominated oligomeric polycarbonates based on 4,4'-dihydroxy-3,3',5,5'-tetrabromodiphenyl-2,2-propane (or tetrabromobisphenol A).

Unexpectedly, the additional presence in the blends of the invention of triaryl phosphates gives rise to a synergistic effect to the extent that the proportions of the halogenated polycarbonate necessary to achieve lower overall burn times within the V-O burn rating can be reduced. Advantageously, the triaryl phosphate can be employed in an amount of from about 0.5 to about 5 percent by weight and, preferably, about 0.5 to about 2 percent based on the combined weight of the copolyamide, halogenated polycarbonate and the phosphate.

Illustrative, but not limiting, of the triaryl phosphates are triphenyl phosphate, isopropylated triphenyl phosphate, tri(tolyl)phosphate, tri(xylyl)phosphate, tri(p-chlorophenyl)phosphate, tri(p-bromophenyl)phosphate, the aromatic polyphosphates such as the bis diphenyl phosphates of resorcinol, hydroquinone, or bisphenol A, or their polymeric counterparts. Preferred are the simple triaryl phosphates such as triphenyl, tri(p-chlorophenyl), tri(p-bromophenyl), tri(p-tolylphenyl), and tri(xylyl)phosphates.

The polyamides characterized by the recurring unit of Formula (I) above, are themselves well known and readily prepared using the methods described in U.S. Pat. Nos. 4,065,441; 4,072,665; 4,087,481 and 4,156,065 whose disclosures are incorporated in their entirety herein by reference. As set forth in these patents, the copolyamides can be made by various techniques including the melt polymerization of the appropriate dicarboxylic acids and appropriate diamines or by the acid chloride process in which the dicarboxylic acid chlorides are reacted with the appropriate amines. Preferably, the polyamides are made by reaction of the appropriate dicarboxylic acids or mixtures of dicarboxylic acids with the appropriate aromatic diisocyanates or mixtures of aromatic diisocyanates. Full details of these processes are given in the aforesaid patents and will not be repeated here.

Preferred classes of copolyamides for the blends of the invention include:

1. copolyamides characterized by the recurring unit (I) wherein in about 30 to about 60 percent of said units, R is alkylene from 6 to 10 carbon atoms, inclusive, in the remainder of said recurring units R is m-phenylene, in about 70 to about 95 percent of said recurring units Ar represents 4,4'-methylenebis(phenylene) and, in the remainder of said units, Ar is tolylene. Preferably, those units in the polyamide in which Ar represents tolylene are also those in which R is m-phenylene;

2. copolyamides characterized by the recurring unit (I) wherein in about 50 to about 85 percent of said units, R is alkylene from 6 to 10 carbon atoms and, in the remainder of said units, R is tetramethylene, and Ar represents 4,4'-methylenebis(phenylene);
3. copolyamides characterized by the recurring unit (I) wherein in about 60 to about 85 percent of said units, R is alkylene from 6 to 10 carbon atoms and, in the remainder of said units, R is m-phenylene, and Ar represents 4,4'-methylenebis(phenylene); and
4. copolyamides characterized by the recurring unit (I) wherein in about 30 to about 60 percent of said units, R is alkylene from 6 to 10 carbon atoms, in about 10 to about 40 percent of said units R is m-phenylene, and in about 20 to about 40 percent R represents tetramethylene, and Ar represents 4,4'-methylenebis(phenylene).

Particularly preferred classes include those of the groups 2 and 4 above.

Additionally, the polymer blends can also have incorporated therein any of the various additives such as fillers, antioxidants, other fire retardants, plasticizers, reinforcing agents and the like provided that these additional additives do not detract from the clarity of the molded polymers.

The molded products prepared from the present blends retain the excellent tensile properties of the base copolyamides while retaining their original clarity and meeting the 94 V-O rating. The test conditions of the Underwriters Laboratories UL-94 vertical burn test are fully described in footnote 3 of Table I, Example 1. Suffice it to say that in order to achieve the V-O rating it is necessary that five test specimens satisfy all three criteria of (1) average combustion time of 5 seconds or less, (2) longest combustion time for any given sample of 10 seconds or less, and (3) in all tests with an absorbent cotton wadding 12 inches below the lower ends of the burning specimens that no cotton be burned by molten drip.

Accordingly, the blends of the invention are useful for all the utilities for which the base copolyamides are employed. More importantly, these blends find particular utility in wire and cable coatings in those applications which call for fire retardant materials meeting the V-O rating in industrial and office buildings. The combination of clarity with good fire resistance makes the blends useful in the manufacture of molded under-the-hood fuel filter bowls in automotive, industrial and farm machinery, and marine applications; and in the manufacture of molded electrical connectors, switch covers, and the like allowing rapid visual observation for maintenance purposes.

The following examples describe the manner and process of making and using the invention and set forth the best mode contemplated by the inventors of carrying out the invention but are not to be construed as limiting.

EXAMPLE 1

The following experiment describes the preparation of two fire retardant polyamide blends (A and B) in accordance with the present invention using a base copolyamide prepared in accordance with U.S. Pat. No 4,065,441.

The copolyamide was prepared by reacting the following ingredients in the stated proportions of parts by weight: 3082 parts (32.81 equivs.) of azelaic acid, 1016 parts (13.96 equivs.) of adipic acid, 40 parts of Irganox 1098 (antioxidant supplied by Ciba-Geigy Co.), 106 parts (0.37 equivs.) of stearic acid, and 17.6 parts of 1,3-dimethylphospholene-1-oxide were dissolved in 23,980 parts of tetramethylene sulfone and the solution heated to a temperature of from about 196° C. to about 214° C.; 5930 parts (47.44 equivs.) of 4,4'-methylenebis(phenyl isocyanate) were added slowly to the reaction mixture over a period of about 19.5 hours (NCO index=1.01); following a hold period of about one hour at the above temperature range the hot reaction solution was passed through a first thin film evaporator (Filmtruder #1) operating under 105 Torr pressure and heating temperature (circulating oil) of about 293° C. with the discharge stream feeding to a second thin film evaporator (Filmtruder #2) operating under an average pressure of about 87 Torr and 270° C.; the discharge temperature of the molten copolyamide from the evaporator was about 289° C. and it was fed through a die as a ⅛" strand onto an endless belt where it cooled, solidified and was led to a chopper which pelletized the solid polymer.

Thus, there was obtained a clear transparent copolyamide according to formula (I) above wherein in about 70 percent of the recurring units, R represents heptylene with the remainder represented by tetramethylene and Ar is 4,4'-methylenebis(phenylene). The polyamide was characterized by $\eta$ inh=0.71 dl/g. (0.5 weight percent at 30° C. in dimethylformamide/lithium chloride); solvent content by thermal gravimetric analysis was about 2 percent by weight.

Blend A was prepared by first tumbling 2000 gm. of the above pelletized copolyamide in a jar with 160 gm. of powdered tetrabromobisphenol A carbonate oligomer containing about 58 percent by weight bromine (supplied by Great Lakes Chemical Corporation, West Lafayette, Ind. under the trade name of Great Lakes BC-58). The coated pellets were extruded through a Brabender extruder to form ⅛" diameter rope. Extrusion conditions were as follows: barrel size of ¾" diameter with L/D of 24/1; single screw-straight flight, 50 r.p.m.; barrel temperature of 265° C. The rope was pelletized and molded into 5"×5"×1/16" plaques using an Arburg Model 305-210-700 injection molding machine with molding conditions as follows: pressure 15,000 psi; screw speed (r.p.m.)=110; barrel temperature of 260° C. from feed zone to 290° C. at last zone; mold temperature=90° C.

Blend B was prepared identically to A above except that an added ingredient of 20 gms. of trixylyl phosphate was tumbled with the 2000 gms. of copolyamide and 160 gms. of BC-58 oligomeric polycarbonate. The blend was processed identically to A to form 5"×5"×1/16" plaques.

The physical properties of the blends A and B along with their flame retardancy ratings as measured by the Underwriters Laboratories UL-94 vertical burn test are set forth in Table I and compared with the properties of the base copolyamide itself.

TABLE I

| | Polyamide | Blend A | Blend B |
|---|---|---|---|
| Tensile str., psi | | | |
| Yield | 10,800 | 11,140 | 11,140 |
| Break | 10,960 | 11,060 | 10,730 |
| Tensile modulus, psi | 245,200 | 274,900 | 271,300 |
| Elongation % | | | |

TABLE I-continued

| | | | |
|---|---|---|---|
| Yield | 8.6 | 8.2 | 8.1 |
| Break | 99 | 91 | 89 |
| Heat Deflection Temperature[1] (264 psi) °C. | Not determined | 104° C. | 100° C. |
| 1/8" Notched Izod[2] ft-lbs/in. of notch | 2.59 | 1.72 | 1.72 |
| UL-94 (1/16" thick)[3] | Unclassified[3] | 94 V-0 | 94 V-0 |

Footnotes to Table I:
[1]Heat deflection temperature (HDT) measured at the stated pressure in accordance with ASTM Test D648-56.
[2]Notched Izod impact strength measured in accordance with ASTM Test D256-56 and determined as average values for ten determinations.
[3]UL-94-V0 is the highest rating for non-burning of plastics when tested in the UL-94 vertical burn test in accordance with the test method described by Underwriters Laboratories, Inc., Northbrook, Illinois. The test specimen measures 5" × 1/2" × 1/16" thickness. Specimens are conditioned by storage for 48 hours at 23° C. and 50% relative humidity followed by 168 hours at 70° C. then cooled in a desiccator prior to testing.
The specimen is clamped by one end so that it hangs vertically in a draft-free chamber with the lower end suspended 12" above a 2 square inch thin layer of cotton.
A 3/4" blue flame of a bunsen burner is held for 10 seconds under the sample then removed and flame duration noted. The flame is placed again for another 10 second period. Specimens are tested in sets of five for each blend. Test observations include duration of flame after first and second flame application, whether sample burns up to the clamp, particularly whether specimen drips flaming particles to ignite the cotton.
To achieve UL-90-V0 the specimen must not burn more than 10 seconds after either flame application; total combustion time not to exceed 50 seconds for all 10 applications (5 specimens × 2 flame applications each); no burning up to clamp; no flaming drip or cotton ignition; specimen glow time no more than 30 seconds after removal of second flame.
The unclassified UL-94 rating for the base Polyamide sample means not only its failure to achieve a V-0 rating when tested but its failure to qualify for either one of the lower test categories of V-1 or V-2.

Both molded blends A and B were clear, transparent samples which retained essentially all of the good physical properties of the base Polyamide with only the slight drop-off noted in elongations and impact strengths. At the same time, both blends at 1/16" thickness received the highest V-O rating in the burn tests according to UL-94 described in footnote 3 of Table I signifying no flaming drip. Comparatively, the base Polyamide burned and dripped to the extent that it could not be classified under any of the test's ratings of V-O, V-1, or V-2.

EXAMPLE 2

Using essentially the same procedure as described in Example 1 above and the same copolyamide except for its preparation from a different batch, three fire retardant blends were prepared. Blend C in accordance with the present invention was prepared by tumbling 1000 gms. of the copolyamide with 78 gms. of a powdered tetrabromobisphenol A carbonate oligomer containing about 52 percent by weight bromine (supplied by Great Lake Chemical Corp. under the trade name of Great Lakes BC-52). The coated pellets were extruded through a Brabender and molded into the 5"×5"×1/16" plaques according to the procedures described in Example 1.

Comparison blends 1 and 2 were each similarly prepared from 1000 gms. of the copolyamide with 80 gms. of Thermogard 240 and 230, respectively. These additives are brominated epoxy resins supplied by M & T Chemicals Corp. and they contain 49 to 51 percent by weight bromine.

The three blends were tested by the UL-94 test procedures described in footnote 3 of Table I above with the following results shown in Table II.

TABLE II

| | Blend C | Comparison Blend 1 | Comparison Blend 2 |
|---|---|---|---|
| UL-94 (1/16" thick) | 94 V-0 | 94 V-0 | 94 V-1 |
| Appearance | Slight Haze, almost clear | not clear | not clear |

Blend C was essentially clear showing only a slight haze and had a 94 V-O rating. Comparison blend 1, while having a V-O rating, was not a clear material being opaque. Similarly, comparison blend 2 was opaque and only had the 94 V-1 rating.

EXAMPLE 3

Using essentially the same procedure as described in Example 1 with the same copolyamide except for its preparation from different batches, two fire retardant blends D and E in accordance with the present invention were prepared.

Blend D was prepared by tumbling 2000 gms. of the copolyamide with 80 gms. of the tetrabromobisphenol A carbonate oligomer BC-58 described in Example 1, 20 gms. of trixylyl phosphate, and 10 gms. of Irganox 1098 antioxidant (supplied by Ciba-Geigy Corp.). The coated pellets were extruded, then molded into test bars and the 5"×5"×1/16" plaques. Its physical and flame retardant properties are set forth in Table III.

Blend E was similarly prepared except that 80 gms. of the tetrabromobisphenol A carbonate oligomer BC-52 described in Example 2 was employed along with the 20 gms. of trixylyl phosphate and 20 gms. of the Irganox 1098 instead of the 10 gms. used in Blend D. Only the flame retardancy tests were carried out on blend E.

Both D and E were clear samples and both received the 94 V-O rating. Physical properties of blend D were quite comparable to those of the base copolyamide (see Table I above).

TABLE III

| | Blend D[1] | Blend E |
|---|---|---|
| Tensile str. psi | | |
| Yield | 10,530 | — |
| Break | 12,060 | — |
| Tensile modulus psi | 270,980 | — |
| Elongation % | | |
| Yield | 7.5 | — |
| Break | 115 | — |
| 1/8" Notched Izod | 1.78 | — |
| UL-94 (1/16" thick) | 94 V-0 | 94 V-0 |
| Appearance | clear | clear |

Footnote to Table III
[1]The UL-94 tests were carried out on a different batch preparation of Blend D than that employed for the determination of physical properties.

EXAMPLE 4

Using essentially the same procedure as described in Example 1 with the same copolyamide except for its preparation from different batches, four clear transparent fire retardant blends F through I in accordance with the present invention were prepared.

Each blend was prepared by tumbling 1000 gms. of the copolyamide with the required proportions of the tetrabromobisphenol A carbonate oligomer BC-58 to result in the percent by weight proportions set forth in Table IV. Blends H and I additionally contained the required proportions of trixylyl phosphate (TXP) in the tumbling process to result in the percent by weight proportions of TXP also set forth in Table IV. The coated pellets were extruded, chopped, then molded into ⅛" tensile bars (per ASTM D638 Type I) using the conditions set forth in Example 1. The flame retardant properties observed for the ⅛" thick samples are set forth in Table IV including the total combustion time in seconds.

Blends F and G had V-0 ratings and burn times of 34 and 36 seconds, respectively. Blend H showed the synergistic effect of the TXP on the blend by decreasing the burn time to only 16 seconds (greater than 50 percent reduction) compared with the 36 seconds for G at the higher BC-58 concentration. Blend I still showed approximately the same burn time as H even though the TXP concentration had doubled over H.

A blend of the copolyamide at 1 percent concentration of the BC-58 achieved only the V-1 rating and at the 9 percent level the blend was rated at V-0 but was not clear transparent.

TABLE IV

|  | Blend F | Blend G | Blend H | Blend I |
| --- | --- | --- | --- | --- |
| BC-58 (% by wt.) | 2% | 4% | 3% | 3% |
| TXP (% by wt.) | — | — | 0.5% | 1% |
| UL-94 Rating | V-0 | V-0 | V-0 | V-0 |
| Burn Time (secs.) | 34 | 36 | 16 | 18 |

EXAMPLE 5

A clear transparent flame-retardant blend J in accordance with the invention was prepared using the same procedure set forth in Example 1. The copolyamide employed was prepared in accordance with U.S. Pat. No. 4,156,065 by reacting the following ingredients in the proportions of parts by weight: 291.2 parts (3.1 equivalents) of azelaic acid, 100.8 parts (1.22 equivalents) of isophthalic acid, 134.4 parts (1.84 equivalents) of adipic acid, and about 770 parts (6.16 equivalents) of 4,4'-methylenebis(phenyl isocyanate) in tetramethylenesulfone solvent using 1-methyl-phospholene-1-oxide as a catalyst. The copolyamide was in accordance with formula (I) wherein in about 50 percent of the recurring units R is heptylene, in about 20 percent the units are meta-phenylene, and in about 30 percent the units are tetramethylene and Ar is 4,4'-methylenebis(phenylene). The solidified copolyamide was then pelletized prior to the blending procedure.

The blend was prepared by tumbling 965 gms. of the copolyamide with 30 gms. of powdered tetrabromobisphenol A carbonate oligomer BC-58 and 5.0 gms. of trixylyl phosphate so that the concentrations were 3 percent and 0.5 percent respectively. The coated pellets were extruded, then molded into ⅛" tensile bars (per ASTM 638 type I).

Samples of the ⅛" thick molded copolyamide containing no additives and the blend J were subjected to the UL-94 test and found to have V-1 and V-0 ratings respectively. The blend J showed an extremely short burn time of only 11 seconds.

We claim:

1. A transparent flame-retardant polymer blend which comprises
   (1) a copolyamide having a recurring unit of the formula

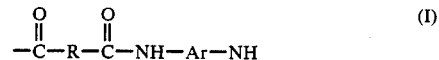

wherein Ar represents arylene and, in about 30 to about 85 percent of the recurring units, R represents alkylene from 6 to 12 carbon atoms, inclusive, in 0 to about 70 percent of the recurring units R represents m-phenylene, and in 0 to about 50 percent of said recurring units R represents tetramethylene; and
   (2) from about 2 to about 8 percent by weight of an oligomeric or polymeric halogenated aromatic polycarbonate.

2. A polymer blend according to claim 1 wherein said flame-retardant polycarbonate is an oligomeric halogenated polycarbonate.

3. A polymer blend according to claim 1 additionally containing a synergistic amount of a triaryl phosphate.

4. A polymer blend according to claim 3 wherein the amount of said triaryl phosphate is from about 0.5 to about 5 percent by weight.

5. A polymer blend according to claim 1 wherein said copolyamide, in about 30 to about 60 percent of the recurring units, R represents alkylene from 6 to 10 carbon atoms, inclusive, in the remainder of said recurring units R is m-phenylene, in about 70 to about 95 percent of said recurring units Ar represents 4,4'-methylenebis(phenylene) and in the remainder of said recurring units Ar is tolylene.

6. A polymer blend according to claim 1 wherein said copolyamide, in about 50 to about 85 percent of the recurring units, R represents alkylene from 6 to 10 carbon atoms, inclusive, and in the remainder R represents tetramethylene, and Ar represents 4,4'-methylenebis(phenylene).

7. A polymer blend according to claim 6 wherein in about 70 percent of the recurring units, R represents heptylene and said flame-retardant oligomer is a tetrabromobisphenol A carbonate oligomer containing about 58 percent by weight bromine.

8. A polymer blend according to claim 7 additionally containing from about 0.5 to about 5 percent by weight of trixylyl(phosphate).

9. A polymer blend according to claim 1 wherein said copolyamide, in about 30 to about 60 percent of the recurring units, R represents alkylene from 6 to 10 carbon atoms, inclusive, in about 10 to about 40 percent R represents m-phenylene, and in about 20 to about 40 percent R represents tetramethylene, and Ar represents 4,4'-methylenebis(phenylene).

10. A polymer blend according to claim 9 wherein in about 40 to about 50 percent of the recurring units, R represents heptylene, in about 20 to about 30 percent R represents m-phenylene and in about 30 percent R represents tetramethylene and said flame-retardant oligomer is a tetrabromobisphenol A carbonate oligomer containing about 58 percent by weight bromine.

11. A polymer blend according to claim 10 additionally containing from about 0.5 to about 5 percent by weight of trixylyl(phosphate).

* * * * *